US011709885B2

(12) United States Patent
Collomosse et al.

(10) Patent No.: US 11,709,885 B2
(45) Date of Patent: Jul. 25, 2023

(54) DETERMINING FINE-GRAIN VISUAL STYLE SIMILARITIES FOR DIGITAL IMAGES BY EXTRACTING STYLE EMBEDDINGS DISENTANGLED FROM IMAGE CONTENT

(71) Applicant: Adobe Inc., San Jose, CA (US)

(72) Inventors: John Collomosse, Woking (GB); Zhe Lin, Fremont, CA (US); Saeid Motiian, San Francisco, CA (US); Hailin Jin, San Jose, CA (US); Baldo Faieta, San Francisco, CA (US); Alex Filipkowski, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 215 days.

(21) Appl. No.: 17/025,041

(22) Filed: Sep. 18, 2020

(65) Prior Publication Data

US 2022/0092108 A1    Mar. 24, 2022

(51) Int. Cl.
| | | |
|---|---|---|
| *G06T 7/00* | (2017.01) | |
| *G06F 16/583* | (2019.01) | |
| *G06F 16/532* | (2019.01) | |
| *G06N 3/08* | (2023.01) | |
| *G06F 16/535* | (2019.01) | |
| *G06V 10/82* | (2022.01) | |
| *G06V 20/30* | (2022.01) | |

(52) U.S. Cl.
CPC ........ *G06F 16/5854* (2019.01); *G06F 16/532* (2019.01); *G06F 16/535* (2019.01); *G06F 16/5838* (2019.01); *G06N 3/08* (2013.01); *G06V 10/82* (2022.01); *G06V 20/30* (2022.01)

(58) Field of Classification Search
CPC ....................................................... G06N 3/08
See application file for complete search history.

(56) References Cited

U.S. PATENT DOCUMENTS

2019/0057268 A1\* 2/2019 Burge .................... G06V 10/82
2021/0233239 A1\* 7/2021 Li ......................... G16H 30/40

OTHER PUBLICATIONS

E. Cetinic and S Grgic. "Automated painter recognition based on image feature extraction". In: Proc. ELMAR. 2013.

(Continued)

*Primary Examiner* — Edward Park
(74) *Attorney, Agent, or Firm* — Keller Preece PLLC

(57) ABSTRACT

The present disclosure relates to systems, methods, and non-transitory computer readable media for accurately and flexibly identifying digital images with similar style to a query digital image using fine-grain style determination via weakly supervised style extraction neural networks. For example, the disclosed systems can extract a style embedding from a query digital image using a style extraction neural network such as a novel two-branch autoencoder architecture or a weakly supervised discriminative neural network. The disclosed systems can generate a combined style embedding by combining complementary style embeddings from different style extraction neural networks. Moreover, the disclosed systems can search a repository of digital images to identify digital images with similar style to the query digital image. The disclosed systems can also learn parameters for one or more style extraction neural network through weakly supervised training without a specifically labeled style ontology for sample digital images.

20 Claims, 11 Drawing Sheets

(56) References Cited

OTHER PUBLICATIONS

Ting Chen et al. "A Simple Framework for Contrastive Learning of Visual Representations". In: arXiv preprint arXiv:2002.05709 (2020).
Wei-Ta Chu and Yi-Ling Wu. "Image Style Classification Based on Learnt Deep Correlation Features". In: IEEE Transactions on Multimedia PP (Feb. 2018), pp. 1-1.
J. Collomosse et al. "Sketching with Style: Visual Search with Sketches and Aesthetic Context". In: Proc. ICCV. 2017.
L. A. Gatys, A. S. Ecker, and M. Bethge. "Image Style Transfer Using Convolutional Neural Networks". In: Proc. CVPR. 2016, pp. 2414-2423.
Golnaz Ghiasi et al. "Exploring the structure of a real-time, arbitrary neural artistic stylization network". In: 2017. URL: https://arxiv.org/abs/1705.06830.
A. Gilbert et al. "Disentangling Structure and Aesthetics for Content-aware Image Completion". In: Proc. CVPR. 2018.
Aaron Hertzmann et al. "Image Analogies". In: Proc. ACM SIGGRAPH. 2001, pp. 327-340.
X. Huang and S. Belongie. "Arbitrary style transfer in real-time with adaptive instance normalization". In: Proc. ICCV. 2017.
Xun Huang et al. "Multimodal Unsupervised Image-to-image Translation". In: ECCV. 2018.
J. Johnson, A. Alahi, and L. Fei-Fei. "Perceptual losses for real-time style transfer and super-resolution". In: Proc. ECCV. 2016.
S. Karayev et al. "Recognizing image style". In: Proc. BMVC. 2014.
T. Karras, S. Laine, and T. Aila. "A Style-Based Generator Architecture for Generative Adversarial Networks". In: Proc. CVPR. 2019.
Prannay Khosla et al. "Supervised Contrastive Learning". In: arXiv preprint arXiv:2004.11362 (2020).
H. Lee et al. "Directional texture transfer". In: Proc. ACM NPAR. 2000.
Jing Liao et al. "Visual Attribute Transfer through Deep Image Analogy". In: arXiv preprint arXiv:1705.01088 (2017).
T.-Y. Lin and S. Majo. "Visualizing and understanding deep texture representations". In: Proc. CVPR. 2016.
L. Marchesotti, F. Perronnin, and F. Meylan. "Learning beautiful (and ugly) attributes". In: Proc. BMVC. 2013.
Jérôme Revaud et al. "Learning With Average Precision: Training Image Retrieval With a Listwise Loss". In: 2019 IEEE/CVF International Conference on Computer Vision (ICCV) (2019), pp. 5106-5115.
Olaf Ronneberger, Philipp Fischer, and Thomas Brox. U-Net: Convolutional Networks for Biomedical Image Segmentation. 2015. arXiv: 1505.04597 [cs.CV].
M. Ruder, A. Dosovitskiy, and T. Brox. "Artistic style transfer for videos". In: Proc. GCPR. 2016.
L. Shamir et al. "Impressionism, expressionism, surrealism: automated recognition of painters and schools of art". In: IEEE Trans. Applied Perception (2010).
K. Simonyan and A. Zisserman. "Very deep convolutional networks for large-scale image Yecognition". In: Proc. ICLR. 2015.
D. Ulyanov, A. Vedaldi, and V. Lempitsky. "Instance normalization: The missing ingredient for fast stylization". In: arXiv preprint arXiv:1607.08022 (2016).
D. Ulyanov et al. "Texture networks: Feed-forward synthesis of textures and stylized images." In: Proc. ICML. 2016.
Paul Upchurch, Noah Snavely, and Kavita Bala. "From A to Z: supervised transfer of style and content using deep neural network generators". In: arXiv preprint arXiv:1603.02003 (2016).
X. Wang et al. "Multimodal transfer: A hierarchical deep convolutional neural network for fast artistic style transfer." In: Proc. CVPR. 2017.
Michael J. Wilber et al. "BAM! The Behance Artistic Media Dataset for Recognition Beyond Photography". In: Proc. ICCV. 2017.
J. Zhu et al. "Unpaired Image-to-Image Translation Using Cycle-Consistent Adversarial Networks". In: 2017 IEEE International Conference on Computer Vision (ICCV). 2017, pp. 2242-2251.
J. Zujovic et al. "Classifying paintings by artistic genre: an analysis of features and classifiers". In: Proc. IEEE Workshop on Multimedia Sig. Proc. (MMSP). 2009.

\* cited by examiner

| Threshold $C_N$ | Groups | Samples | Average samples/group |
|---|---|---|---|
| Reference | 100,000 | 1,200,000 | 12 |
| 1 | 99,660 | 1,142,333 | 11.46 |
| 2 | 101,050 | 967,017 | 9.57 |
| 3 | 99,140 | 701,673 | 7.08 |
| 4 | 74,000 | 378,846 | 5.12 |
| 5 | 29,282 | 111,556 | 3.81 |

304

302

| Model | BAM-FG | | |
|---|---|---|---|
| | IR T-1 | IR T-5 | IR T-10 |
| Karayev | 3.28 | 5.43 | 6.59 |
| NST | 6.31 | 7.82 | 9.86 |
| NST-CGM | 3.54 | 8.32 | 10.89 |
| DML-BAM | 3.57 | 6.87 | 9.95 |
| DML-BAMX | 3.04 | 6.18 | 8.70 |

*Fig. 8A*

| Annotation | Backbone | Loss | IR-1 | IR-3 | IR-5 | IR-10 |
|---|---|---|---|---|---|---|
| None | MUNIT | L1 | 4.12 | 5.37 | 6.92 | 9.45 |
| None | ALADIN | L1 | 16.55 | 19.43 | 22.50 | 26.72 |
| BAM-FG-Raw | MUNIT | L1+Triplet | 17.68 | 21.56 | 25.89 | 31.67 |
| BAM-FG-Raw | ALADIN | L1+Triplet | 25.60 | 29.59 | 33.71 | 38.93 |
| BAM-FG-Raw | MUNIT | L1+Listwise | 18.04 | 21.40 | 24.91 | 29.62 |
| BAM-FG-Raw | ALADIN | L1+Listwise | 30.03 | 34.17 | 38.42 | 43.67 |
| BAM-FG-Raw | ResNet | Softmax | 1.97 | 3.25 | 5.18 | 8.41 |

*Fig. 8B*

| Data | Backbone | IR-1 | IR-3 | IR-5 | IR-10 |
|---|---|---|---|---|---|
| BAM-FG-Raw | Fused | 42.60 | 47.57 | 52.28 | 57.65 |
| BAM-FG-$C_5$ | Fused | 50.40 | 56.00 | 61.26 | 67.50 |

*Fig. 8C*

DETERMINING FINE-GRAIN VISUAL STYLE SIMILARITIES FOR DIGITAL IMAGES BY EXTRACTING STYLE EMBEDDINGS DISENTANGLED FROM IMAGE CONTENT

BACKGROUND

In the field of digital image editing, digital artwork spans a broad range of content depicted in diverse visual styles. Using neural networks or other machine learning models to learn representations suitable for searching digital artwork remains an open challenge. To this end, some digital image search systems can distinguish between digital image styles using only coarse-grain discrimination over a limited number of annotated styles. Thus, not only are these systems limited by the challenges of both defining a suitable ontology to label styles as well as the subjective nature of labelling digital images, but further suffer from a number of disadvantages in flexibility and accuracy.

As just mentioned, many conventional digital image search systems are inflexible in identifying styles of digital images. Particularly, conventional systems often rigidly require labelled classes of digital image to define the styles associated with the digital images. As a result, these conventional systems are limited to a fixed set of possible styles defined by the labelled classes available. Conventional digital image search systems cannot therefore adapt to identify styles beyond those that are already labeled within a dataset.

Due at least in part to their inflexibility, conventional digital image search systems are also inaccurate. Indeed, because many conventional systems depend on a labelled ontology of digital image styles, these conventional systems are only as accurate as the labelled classifications available. Unfortunately, there is a limited class diversity among existing annotated datasets, which severely limits the style determination capabilities of conventional systems. As a result, conventional systems often are only capable of coarse, high-level style determination for digital images and cannot distinguish between more nuanced, fine variations in style. Also contributing to this inaccuracy, conventional systems rely on the annotation of human labelers, which, due to its subjective nature, can sometimes result in incorrect style classifications.

Thus, there are several disadvantages with regard to conventional digital image search systems.

SUMMARY

One or more embodiments described herein provide benefits and solve one or more of the foregoing or other problems in the art with systems, methods, and non-transitory computer readable media that flexibly and accurately determine fine-grain digital image styles utilizing a weakly supervised neural network architecture. For example, the disclosed systems leverage large-scale digital content groupings from digital portfolios to learn parameters of a style extraction neural network without relying on explicit labelling of styles in digital images. The disclosed systems utilize a style extraction neural network to extract a style embedding disentangled from digital image content. The disclosed systems can also (or alternatively) utilize other style extraction neural networks, such as a weakly supervised discriminative neural network, to generate a style embedding for a query digital image. In some embodiments, the disclosed systems combine complementary style embeddings from a first style extraction neural network and a second style extraction neural network to determine the style of a query digital image. Utilizing the style embedding, the disclosed systems identify one or more other digital images that have a similar style to the query digital images by searching a digital image repository and comparing style embeddings of the stored digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 8A-8C illustrate performance results associated with conventional digital image search systems and the style search system in accordance with one or more embodiments;

DETAILED DESCRIPTION

Figure 1:
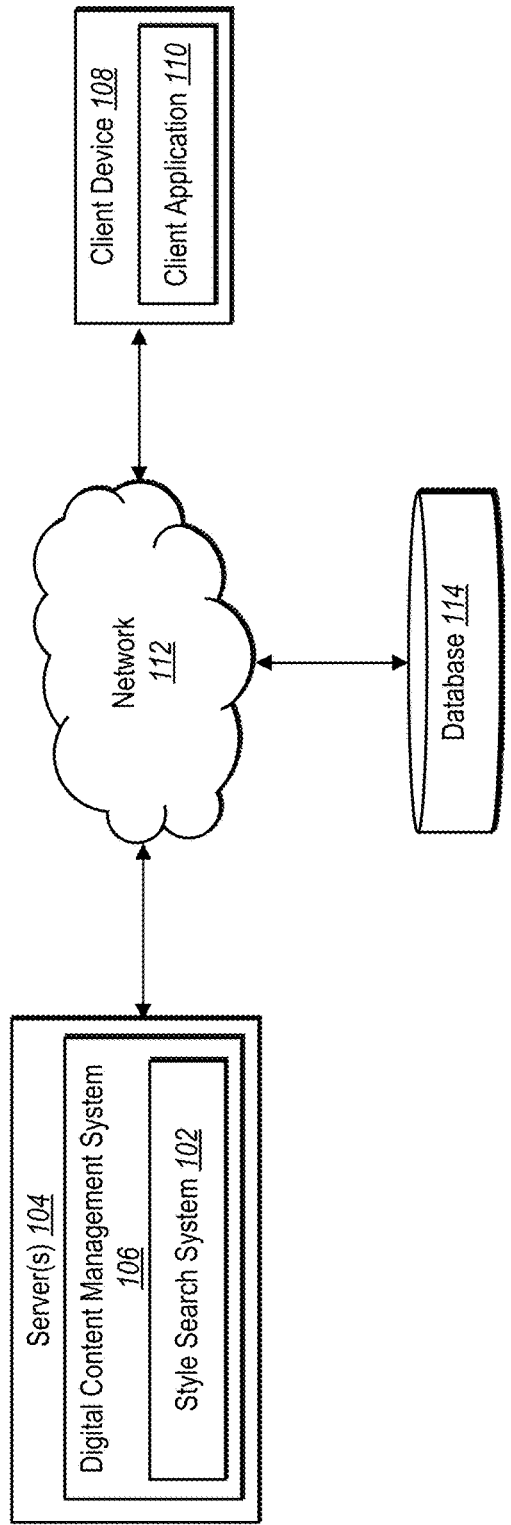
FIG. 1 illustrates an example system environment in which a style search system operates in accordance with one or more embodiments.

One or more embodiments described herein include a style search system that flexibly and accurately determines fine-grain digital image styles utilizing a weakly supervised neural network architecture. In particular, in embodiments described herein, the style search system draws upon large-scale generated digital content groupings published in collections with related visual themes. On the assumption that co-occurrence within a common group is a weak cue for style similarity, the style search system samples millions of such co-occurrences to train a style extraction model for fine-grain style similarity without defining any specific style ontology. For example, the style search system utilizes a style extraction neural network in the form of an autoencoder to extract a style embedding disentangled from image content. As another example, the style search system utilizes a style extraction neural network in the form of a discriminative neural network. As yet another example, the style search system utilizes a style extraction neural network as a combination of an autoencoder and a discriminative neural network, combining complementary features extracted by each architecture. In some embodiments, based on extracted style embeddings, the style search system determines a style for a query digital image and searches a repository of digital images to identify other digital images with styles similar to the query digital image. In these or other embodiments, the style search system further provides the identified digital images for display on a client device.

As mentioned, in embodiments described herein, the style search system generates a style embedding for a query digital image. For example, the style search system utilizes a style extraction neural network to generate a style embedding that defines or reflects a style of the query digital image. In some embodiments, the style search system generates a style embedding disentangled from image content, where content relates to the geometric layout of the query digital image and style relates to an overall appearance or aesthetic of the query digital image.

In one or more embodiments, the style search system utilizes a style extraction neural network in the form of a novel autoencoder neural network architecture to disentangle style codes from a content code of the query digital image. For example, the style search system utilizes a two-branch autoencoder to extract a content code indicating a geometric layout of the query digital image via a content branch and to extract a plurality of style codes from different layers of a style branch of the style extraction neural network. The style search system further combines the plurality of style codes to generate a style embedding as a basis for searching for digital images with similar styles.

In some embodiments, the style search system utilizes a style extraction neural network in the form of a weakly supervised discriminative neural network. For instance, the style search system generates a style embedding for a query digital image by utilizing a weakly supervised discriminative neural network to extract features from the query digital image. Indeed, in some cases, the style search system generates a style embedding such as a feature vector including features that represent observable and/or unobservable characteristics of the query digital image that define or represent its style.

In one or more embodiments, the style search system combines a two-branch autoencoder with a weakly supervised discriminative neural network. For example, the style search system generates a first style embedding utilizing the two-branch autoencoder and generates a second style embedding utilizing the discriminative neural network. Due to the natures of the two-branch autoencoder and the discriminative neural network, the first style embedding and the second style embedding are complementary in that one correlates better to some style cues and the other correlates better to other style cues. For instance, the two-branch autoencoder correlates effectively for color cues, while the weakly supervised discriminative neural network correlates effectively for semantic cues. Thus, in some embodiments, the style search system combines the first style embedding with the second style embedding for additional accuracy.

In at least one embodiment, the style search system searches for additional digital images with similar style to the query digital image. For example, the style search system accesses and searches a repository of digital images for which the style search system has generated corresponding style embeddings. To identify a digital image with style similar to the query digital image, in some embodiments, the style search system compares the style embedding of the query digital image with style embeddings of stored digital images with the repository. For instance, the style search system selects digital images with style embeddings that are within a threshold distance from the style embedding of the query digital image within an embedding space.

As mentioned above, in one or more embodiments, the style search system learns parameters of a style extraction neural network (e.g., a two-branch autoencoder, a discriminative neural network, or a combination of the two). For example, the style search system learns parameters of the style extraction neural network using a weakly supervised training technique. Indeed, while discriminative neural networks are ordinarily trained using strongly supervised datasets (e.g., with a labelled ontology), in some embodiments, the style search system trains the style extraction neural network (e.g., the autoencoder and/or the discriminative neural network) without such style labels.

For instance, the style search system relies on common groupings of digital images within user-generated collections as weak cues of shared styles. From these common groupings, and further based on utilizing particular loss functions, the style search system learns parameters for the style extraction neural network to generate style embeddings for query digital images. Relating to the loss functions, in some embodiments, the style search system utilizes a listwise loss function to learn parameters for fine-grain style coherence with a two-branch autoencoder. In these or other embodiments, the style search system utilizes a contrastive loss function (e.g., a normalized temperature-scaled cross entropy loss function) to learn parameters for fine-grain style coherence with a discriminative neural network.

As suggested above, the style search system provides several advantages over conventional digital image search systems. For example, the style search system is more flexible than conventional systems. In particular, while many conventional systems rigidly require a labelled ontology of style classes, the style search system uses weakly supervised training without such class labels. Thus, the style search system is not limited to a fixed set of style classes as are many conventional systems. Rather, the style search system flexibly adapts to identify styles beyond those in the limited datasets available.

Due at least in part to improved flexibility, the style search system further improves accuracy relative to many conventional digital image search systems. In particular, the style search system determines style embeddings for query digital images on a more fine-grain level than conventional systems, which are limited to coarse-grain classifications (as dictated by the labelled datasets on which they are trained). Indeed, the style search system determines more nuanced, detailed levels of style within digital images and thus more accurately searches for, and identifies, digital images with similar style to a query digital image.

For example, the style search system utilizes a novel style extraction neural network architecture (e.g., a modified two-branch autoencoder neural network combined with complementary components of a discriminative neural network) to generate style embeddings to use as a basis for identifying digital images with similar styles. As a contributing factor to this improved accuracy, the style search system uses weakly supervised training for a style extraction neural network, and therefore, does not rely on the subjectivity of human labelers, who may or may not label digital image style correctly. This advantage is particularly salient when searching over diverse collections of digital images in which there is considerable style diversity. Not only is the style search system more accurate and effective in targeted digital image searches, but the learned representation of the style search system is further applicable to mood-board generation and larger multi-faceted searches (e.g., text and style searches).

Additional detail regarding the style search system will now be provided with reference to the figures. For example, FIG. 1 illustrates a schematic diagram of an example system environment for implementing a style search system 102 in accordance with one or more embodiments. An overview of the style search system 102 is described in relation to FIG. 1. Thereafter, a more detailed description of the components and processes of the style search system 102 is provided in relation to the subsequent figures.

As shown, the environment includes server(s) 104, a client device 108, a database 114, and a network 112. Each of the components of the environment communicate via the network 112, and the network 112 may be any suitable network over which computing devices communicate. Example networks are discussed in more detail below in relation to FIG. 11.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single client device 108, in some embodiments the environment includes multiple different client devices, each associated with a different user (e.g., designer). The client device 108 communicates with the server(s) 104 via the network 112. For example, the client device 108 receives user input from a user interacting with the client device 108 (e.g., via the client application 110) to, for instance, select a query digital image and/or request or initiate a search based on a query digital image. Thus, the style search system 102 on the server(s) 104 receives information or instructions to search for and identify digital images with similar style to a query digital image (e.g., from a repository of digital images within the database 114) based on the input received by the client device 108.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a style search interface for indicating one or more query digital images and for displaying other digital images determined to have style similar to the query digital image(s). A user interacts with the client application 110 to provide user input to perform operations as mentioned above, such as indicating a query digital image and performing a style-based digital image search.

As illustrated in FIG. 1, the environment includes the server(s) 104. The server(s) 104 generates, track, store, process, receive, and transmit electronic data, such as digital images, style embeddings, and one or more style extraction neural networks. For example, the server(s) 104 receives data from the client device 108 in the form of a request to search for digital images with similar styles to a query digital image. In addition, the server(s) 104 transmits data to the client device 108 to provide a search interface including one or more digital images identified to have style similar to the query digital image. Indeed, the server(s) 104 communicates with the client device 108 to transmit and/or receive data via the network 112. In some embodiments, the server(s) 104 comprises a distributed server where the server(s) 104 includes a number of server devices distributed across the network 112 and located in different physical locations. The server(s) 104 comprises a content server, an application server, a communication server, a web-hosting server, or a machine learning server.

As shown in FIG. 1, the server(s) 104 also includes the style search system 102 as part of a digital content editing system 106. The digital content editing system 106 communicates with the client device 108 to perform various functions associated with the client application 110 such as providing and searching for digital images within a repository of digital images. For example, the style search system 102 communicates with the database 114 to access a repository of digital images from which to identify digital images with style similar to a query digital image. Indeed, as further shown in FIG. 1, the environment includes a database 114. In particular, the database 114 stores information such as digital images and style embeddings. In some embodiments, the database 114 also stores one or more components of a style extraction neural network, such as a style embedding, style codes, content codes, and/or various loss functions.

Although FIG. 1 illustrates a particular arrangement of the environment, in some embodiments, the environment has a different arrangement of components and/or may have a different number or set of components altogether. For instance, in some embodiments, the style search system 102 is implemented by (e.g., located entirely or in part) on the client device 108 and/or a third-party device. In addition, in one or more embodiments, the client device 108 communicates directly with the style search system 102, bypassing the network 112. Further, in some embodiments, the database 114 is located external to the server(s) 104 (e.g., in communication via the network 112) or located on the server(s) 104 and/or on the client device 108.

Figure 2:
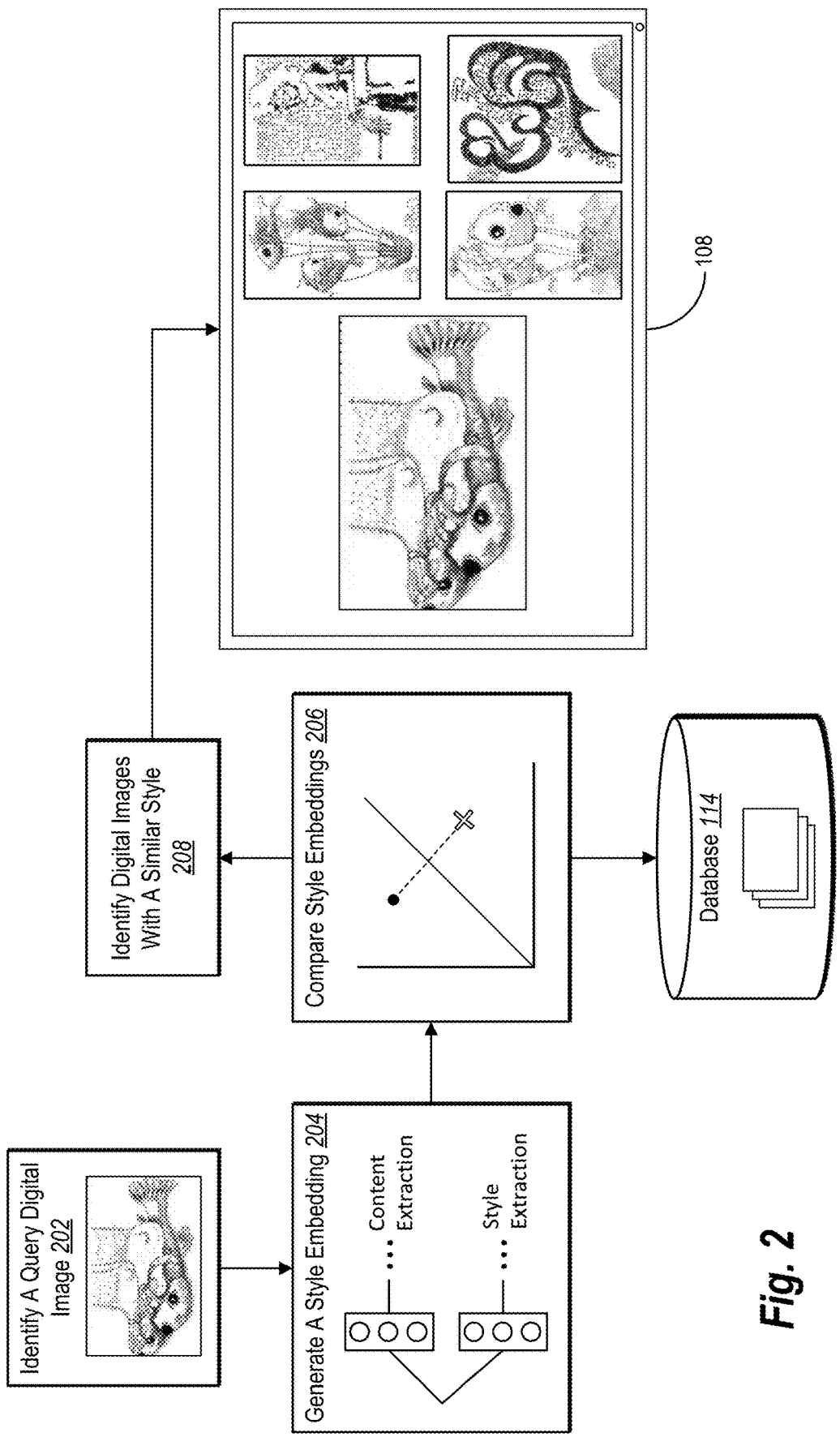
FIG. 2 illustrates an overview of a process of identifying digital images with similar style to a query digital image based on generating style embeddings disentangled from image content in accordance with one or more embodiments.

As mentioned, the style search system 102 searches for, and identifies, digital images with similar style to a query digital image. In some embodiments, the style search system 102 generates a style embedding for a query digital image to compare with style embeddings associated with digital images within a repository of digital images. To generate the style embedding, the style search system 102 utilizes one or more style extraction neural networks such as a novel two-branch autoencoder neural network, a weakly supervised discriminative neural network, or a combination of the two. FIG. 2 illustrates generating search results for digital images with similar style to a query digital image by utilizing a style extraction neural network to generate a style embedding in accordance with one or more embodiments. The description of FIG. 2 provides an overview of acts 202-208 performed by the style search system 102 to identify digital images with similar style to a query digital image. Additional detail regarding the various acts is thereafter provided with reference to subsequent figures.

As illustrated in FIG. 2, the style search system 102 performs an act 202 to identify a query digital image. In particular, the style search system 102 identifies a query digital image based on user interaction selecting or otherwise indicating a query digital image to use as a basis for performing a digital image search. Indeed, the style search system 102 receives an indication from the client device 108 of an upload of a query digital image or a selection of a digital image within a style search interface. From the query digital image, the style search system 102 generates search results including digital images with similar style to the query digital image.

To this end, the style search system 102 performs an act 204 to generate a style embedding. More specifically, the style search system 102 generates a style embedding that includes one or more features indicating a style of a digital image. For instance, the style search system 102 generates a style embedding by combining two or more style codes. In some embodiments, a style embedding refers to a collection or a set of observable features or unobservable (e.g., deep) features that indicate characteristics of a style for a digital image. For example, a style embedding includes a feature vector of one or more constituent style codes combined together. Along these lines, in some embodiments, a style code refers to one or more encoded features of a digital image that captures or represents one or more aspects of style for the digital image. For example, a style embedding is made up of multiple style codes, where the style codes include features representing different aspects of the digital image's style. In some embodiments, different style codes are extracted using different layers of a style extraction neural network. Relatedly, in some embodiments, a style refers to an overall appearance or an aesthetic of a digital image. For example, a style includes a color scheme, a shading pattern, and/or a type of digital brush or applicator used to generate the digital image.

As illustrated in FIG. 2, the style search system 102 utilizes a style extraction neural network to extract one or more style codes from the query digital image and to extract a content code from the query digital image. In some embodiments, a content code refers to one or more features that represent content of a digital image. Along these lines, content of a digital image refers to a geometric layout of the digital image. For example, a content code refers to an encoded representation of geometric layout of, or positioning for, different visual objects (e.g., lines, segments, or splines) within a digital image. In one or more embodiments, a style extraction neural network refers to a two-branch autoencoder neural network, a weakly supervised discriminative neural network, or a combination of both. In any event, a style extraction neural network extracts style codes and generates a style embedding for a digital image such as a query digital image and/or digital images within a digital image repository.

As further illustrated in FIG. 2, the style search system 102 performs an act 206 to compare style embeddings. More specifically, the style search system 102 compares a style embedding for a query digital image with style embeddings for stored digital images within a digital image repository (e.g., within the database 114). For example, the style search system 102 compares style embeddings by determining distances between the style embeddings within an embedding space.

Additionally, the style search system 102 performs an act 208 to identify digital images with a similar style to the query digital image. Particularly, the style search system 102 identifies digital images from the digital image repository that have style embeddings within a threshold similarity of the style embedding of the query digital image. For example, based on comparing the style embeddings (e.g., via the act 206), the style search system 102 identifies and selects digital images whose style embeddings are within a threshold distance of the style embedding for the query digital image within the embedding space.

The style search system 102 thus provides the identified digital images for display on the client device 108 (e.g., with a style search interface). Indeed, as illustrated in FIG. 2, the client device 108 presents a style search interface that includes the query digital image (e.g., the hairy feet in fish sandals), along with four selected digital images with similar style.

Figure 4:
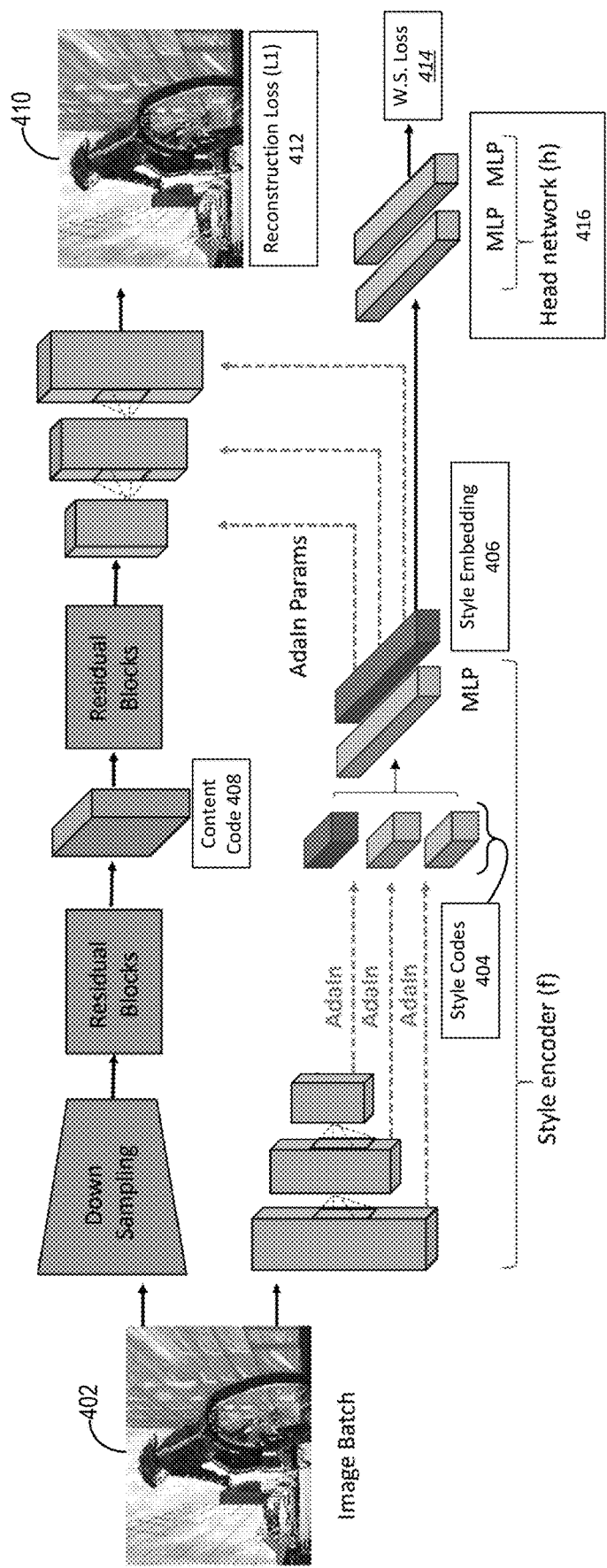
FIG. 4 illustrates an example architecture for a novel two-branch autoencoder style extraction neural network in accordance with one or more embodiments.
Figure 5:
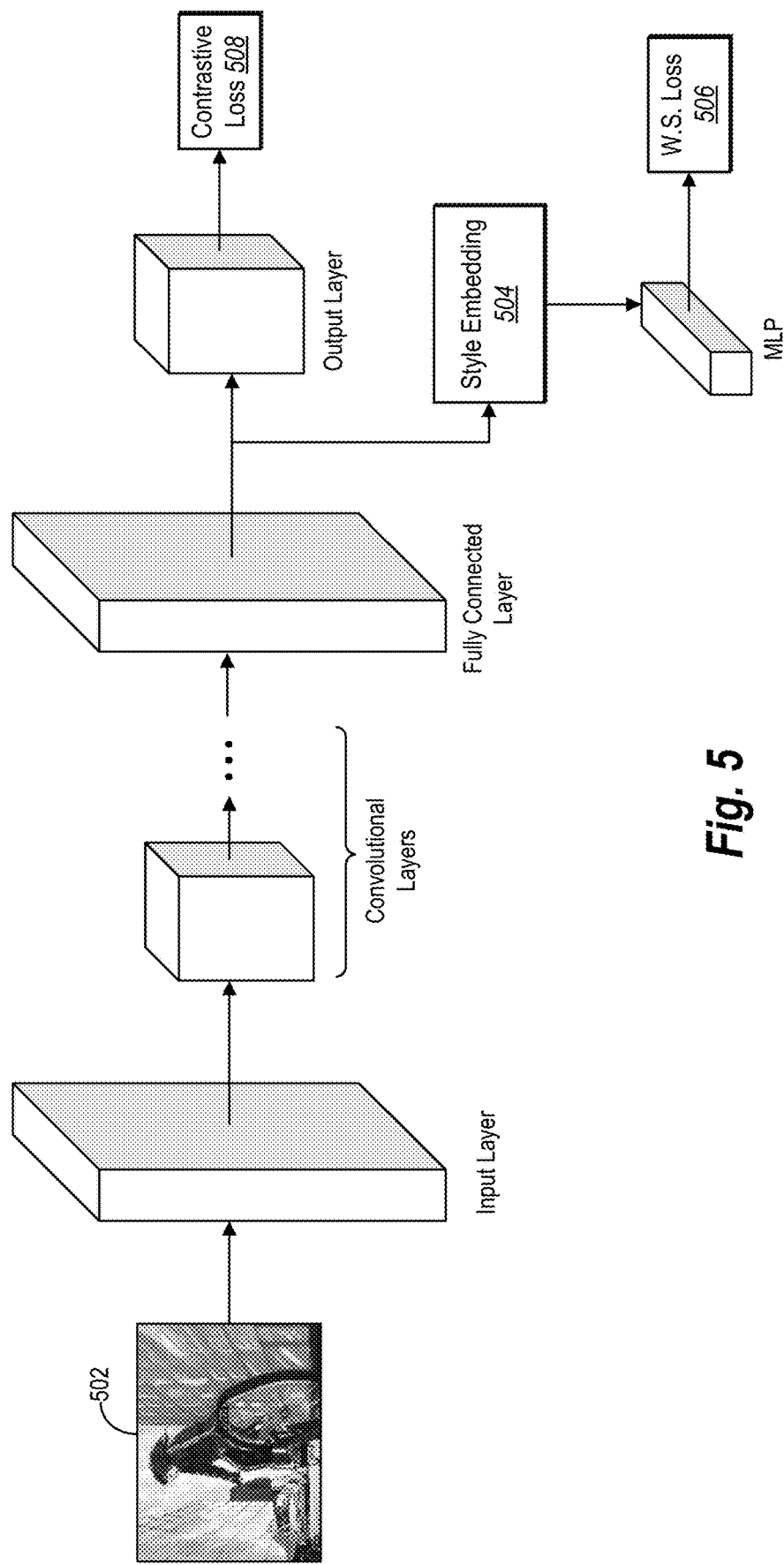
FIG. 5 illustrates an example architecture for a weakly supervised discriminative style extraction neural network in accordance with one or more embodiments.
Figure 6:
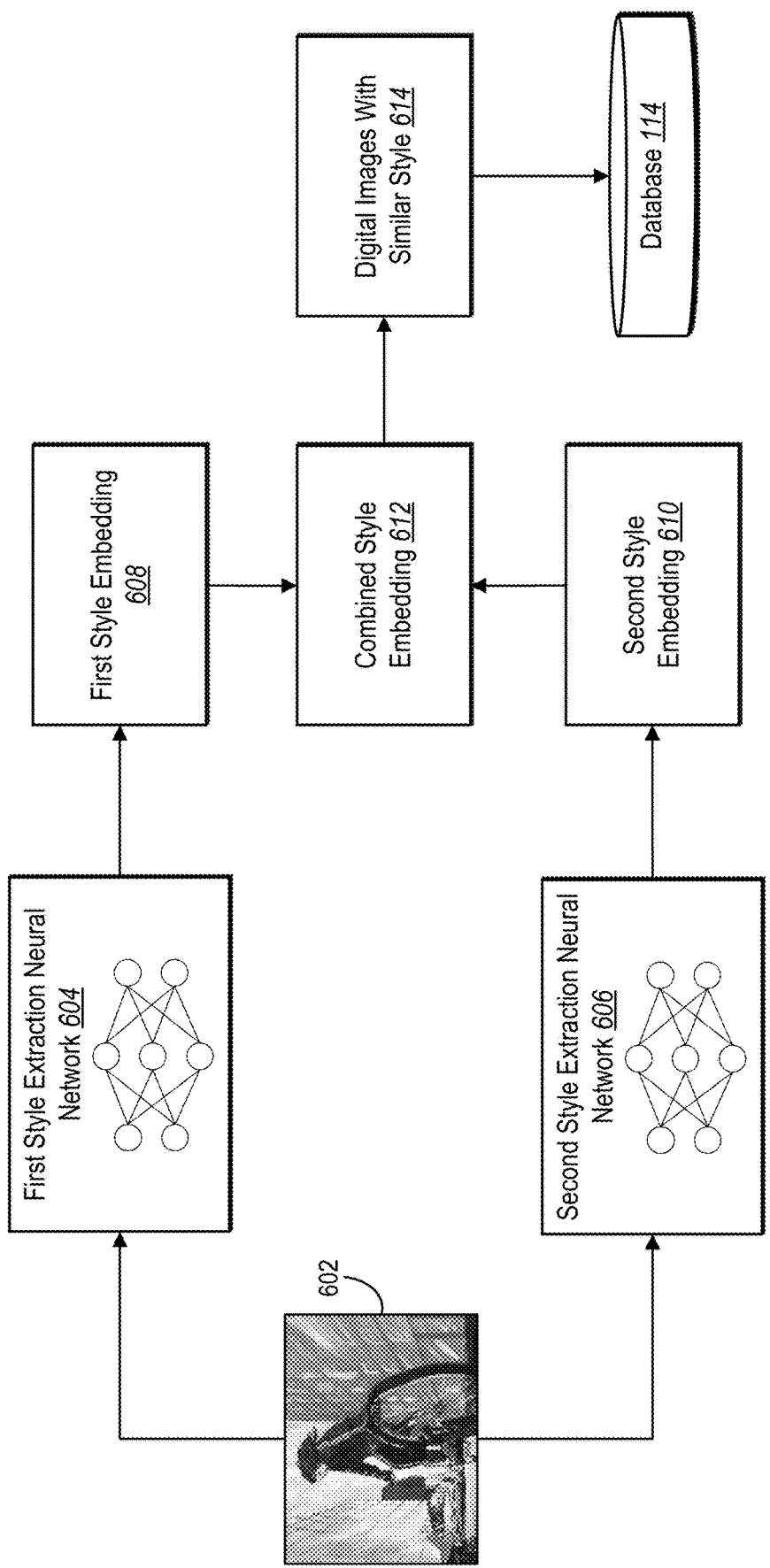
FIG. 6 illustrates an example flow for generating a combined style embedding in accordance with one or more embodiments.

In one or more embodiments, the style search system 102 performs a step for generating a style embedding disentangled from image content for the query digital image. In particular, the style search system 102 utilizes particular acts and algorithms to implement or perform the step for generating the style embedding. Specifically, the description above in relation to the act 204 of FIG. 2, in addition to the corresponding description of FIGS. 4-6, provides acts and algorithms as structure and support for performing a step for generating a style embedding disentangled from image content for the query digital image.

Figure 3:
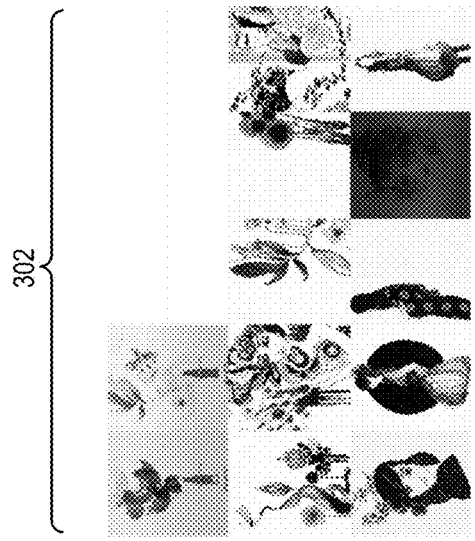
FIG. 3 illustrates example project groupings for weakly supervised training of a style extraction neural network in accordance with one or more embodiments.

To generate style embeddings for digital images, the style search system 102 trains or tunes one or more style extraction neural networks based on training data. Indeed, as mentioned above, the style search system 102 utilizes weak supervision (e.g., training without a defined label ontology) to train a style extraction neural network with a dataset that has no labeled style classifications. Rather, the style search system provides improved flexibility and accuracy across a wider range of (and finer-grained) style classes without such rigid labeling requirements. Instead, the style search system 102 utilizes weak style cues from online collections of digital images. FIG. 3 illustrates generating sample digital images for training or tuning a style extraction neural network in accordance with one or more embodiments.

As illustrated in FIG. 3, the style search system 102 generates a set of sample digital images 302 for learning parameters of a style extraction neural network through training or tuning. In particular, the style search system 102 generates the set of sample digital images 302 from online collections of digital images (e.g., from Behance.net). For instance, the style search system 102 identifies collections of digital images created and grouped by users of the online system, where the project groupings are weak indicators of similar styles among digital images in the same groups. The style search system 102 collects a large number (e.g., 2.2. million) of digital images from a plurality (e.g., 275 thousand) of different project groupings. In addition, the style search system 102 separates the collected digital images into two partitions.

Within the first partition, the style search system 102 includes raw project groupings from Behance. For example, the style search system 102 includes 1 million digital images from among 175 thousand project groupings. Because these project groupings are user-generated by users of Behance, this data is noisy, and the groupings are not necessarily always accurate collections of common styles. The style search system 102 nevertheless utilizes co-membership within common groups as weak supervision for learning parameters of a style extraction neural network. In some embodiments, the style search system 102 subdivides projects into different groups of style-coherent digital images.

Within the second partition (which is a novel dataset), the style search system 102 includes "clean" data for evaluation of the style extraction neural network(s). Indeed, the style search system 102 cleans the noisy data of the raw project groupings using a large-scale crowd annotation task. For example, the style search system 102 provides 1.2 million digital images from among 100 thousand different style-coherent project groups to a crowd-sourcing annotation system, such as AMAZON Mechanical Turk ("AMT"). Labeling devices tag any number of digital images (including zero) that share the same visual style (thereby creating a style group). If multiple styles are present among digital images provided to a labeling device, the labeling device chooses the largest group. Within each provided collection of digital images, the style search system 102 includes (two) distractor digital images to mitigate over-segmentation.

The style search system 102 thus generates a plurality annotation tasks, where each annotation task includes a collection of digital images selectable for indicating shared style. The style search system 102 further provides each annotation task to a number (e.g., 5) of labeling devices. In addition, the style search system 102 determines a consensus using graph-based vote pooling. For instance, the style search system 102 utilizes an affinity matrix $A_{i,j}$ to code edges of a style graph, where the affinity matrix $A_{i,j}$ reflects the number of times digital images i and j were simultaneously selected within an annotation task.

Thus, based on receiving responses from labeling devices indicating which digital images in various annotation tasks share common styles, the style search system 102 increases the relationship, or the style similarity, between digital images that are more frequently identified as sharing a common style. Further, the style search system 102 thresholds the affinity matrix $A_{i,j}$ at a given consensus level $C_N=[1,5]$ to partition a group into sub-groups. The table 304 in FIG. 3 illustrates numbers of digital images (e.g., in the "Samples" column) available in the second partition to sample digital images at each level of consensus, where $C_N=5$ indicates a strongest style similarity, where all labeling devices indicated a common style. $C_N=5$ also returns the highest data quality but the lowest data volume. From FIG. 3, the set of sample digital images 302 includes project groupings of a common styles at a particular consensus level $C_N=3$.

As mentioned above, in some embodiments, the style search system 102 utilizes one or more style extraction neural networks to generate style embeddings for digital images (e.g., for a query digital image and for stored digital images). In particular, the style search system 102 utilizes a style extraction neural network in the form of a novel two-branch autoencoder and/or a weakly supervised discriminative neural network. FIG. 4 illustrates an example architecture of a novel two-branch autoencoder in accordance with one or more embodiments.

As illustrated in FIG. 4, the two-branch autoencoder includes a content branch (above) and a style branch (below) to disentangle style codes from content codes. As shown, the content branch includes various layers including a down sampling layer, residual blocks, and a decoder made of three deconvolution layers (represented by the progressively larger rectangular prisms) to mirror the shape of the encoder of the style branch. The style branch includes an encoder made of three convolutional layers (represented by the progressively smaller rectangular prisms and having 64, 128, and 256 filters respectively), a multilayer perceptron ("MLP") and a head network 416 (made up of multiple MLPs). The two-branch autoencoder extracts a content code 408 and style codes 404 from the digital image 402 (or a pair of digital images which are exchanged to perform style transfer).

In one or more embodiments, the two-branch autoencoder of FIG. 4 is a modified version of the MUNIT architecture described by Xun Huang et al. in *Multimodal Unsupervised Image-to-Image Translation*, ECCV (2018), which is incorporated herein by reference in its entirety. Indeed, the style search system 102 utilizes a modified, novel architecture for the two-branch autoencoder for all-layer adaptive instance normalization ("ALADIN") to aggregate activations from several style encoder layers. For example, the ALADIN architecture of the two-branch autoencoder extracts style codes 404 from multiple layers (as opposed to extracting a single code from a single layer), and the ALADIN architecture further includes an additional MLP to combine the style codes 404 as well as a new head network 416 not included in the original MUNIT architecture. Additionally, rather than passing parameters from a learned style embedding 406 to residual blocks of the content branch (as is done in conventional MUNIT), the ALADIN passes parameters to multiple deconvolution blocks of the decoder.

As shown in FIG. 4, the style search system 102 utilizes the two-branch autoencoder to extract style codes 404 from all three convolutional layers (e.g., one style code from each convolutional layer, as opposed to extracting from only a single convolutional layer as is done in MUNIT). The style search system 102 extracts the style codes 404 via adaptive instance normalization ("AdaIN") mean and variance of feature maps, rather than using a fully connected layer (because the three-layer encoder is only used for style extraction). Using mean and variance of feature maps, the style search system 102 thus generates the style codes 404 with twice as many values as there are filters in the respective layers of the encoder.

Additionally, the style search system 102 generates a style embedding 406 by combining the style codes 404. In particular, the style search system 102 generates the style embedding 406 utilizing one or more layers of the two-branch autoencoder, such as a multilayer perceptron (represented as "MLP") to concatenate the style codes 404 into a high-dimensional embedding (e.g., a style embedding 406 with 864 dimensions). Thus, the style search system 102 combines the style codes 404 utilizing one or more MLPs of the two-branch autoencoder.

As illustrated in FIG. 4, the style search system 102 further utilizes the deconvolution layers to split the style embedding 406 back into same-sized segments to apply those segments to decoder filters. As further shown, the style search system 102 applies or provides early style encoder AdaIN statistics such as mean and variance (e.g., represented by "AdaIN Params" in FIG. 4) to the three decoder layers represented by progressively larger rectangular prisms (as opposed to passing the AdaIN statistics to residual blocks as in a conventional MUNIT architecture).

Additionally, the two-branch autoencoder includes a head network 416 of one or more MLPs. For example, an MLP of a head network includes a hidden layer of size 512 and an $L_2$ normalized output vector of 128 dimensions. Thus, rather than determining the weakly supervised loss 414 based on the learned style embedding 406, the style search system 102 determines the loss using the output of the head network 416 instead.

To generate an accurate style embedding 406 with fine-grained delineations from other style embeddings, the style search system 102 learns parameters for the two-branch autoencoder of FIG. 4 through training or tuning the network. To elaborate, the style search system 102 utilizes weakly supervised training informed by project grouping co-membership. The style search system 102 learns a mapping function $f$ to map a digital image (e.g., the digital image 402) to a style embedding (e.g., the style embedding 406) and a head function $h$ as an additional MLP layer for training. For purposes of this disclosure, the notation for $f$ and $h$ persists through the descriptions of FIGS. 4-5.

As a baseline for training, the style search system 102 utilizes self-supervision in which no project group annotation or correspondence is used. For example, the style search system 102 samples mini-batches of digital images, to identify mini-batches $B=\{b_1, b_2, \ldots, b_{32}\} \subset T$ that minimize the reconstruction loss 412, where T represents the 1 million sample digital images from Behance.net used for training. In some embodiments, the style search system 102 utilizes a reconstruction loss function as given by:

$$L_{rec}(B) = \Sigma_{b \in B} |f(b) - b|$$

where |.| denotes the $L_1$ reconstruction loss 412 and where B are randomly selected from available groups without supervision. By utilizing the reconstruction loss 412, the style search system 102 determines a measure of loss associated with generating the reconstructed digital image 410. The style search system 102 further modifies parameters of the two-branch autoencoder to reduce or minimize the reconstruction loss 412, and thereby, generate more accurate reconstructed digital images to more closely resemble input digital images.

From the baseline of the self-supervised training using the reconstruction loss 412, the style search system 102 learns parameters for the two-branch autoencoder via a weakly supervised loss 414. For example, the style search system 102 modifies parameters of the two-branch autoencoder to identify parameters that reduce or minimize the weakly supervised loss 414 over multiple iterations of training on sample digital images. In some embodiments, the style search system 102 utilizes multiple loss functions together to train a style extraction neural network such as a two-branch autoencoder (e.g., a baseline loss function and a weakly supervised loss function). Indeed, the style search system 102 determines a weakly supervised loss 414 utilizing a pairwise or triplet loss function. More specifically, the style search system 102 forms triplets (including a negative, a positive, and an anchor) by sampling project groupings (as described above in relation to FIG. 3).

For instance, the style search system 102 selects a project grouping $G \subset T$ at random and further selects a digital image a at random from the project grouping G as the anchor. The style search system 102 selects the remaining digital images within the grouping G as positive examples $G^+ = G \backslash \{a\}$. Additionally, the style search system 102 selects an equal number of negative examples from other project groupings $G^- \subset T \backslash G^+$. By thus selecting digital images to form triplets, the style search system 102 generates a mini-batch B of 32 triplets (a, p, n) where $p \in G^+$ and $n \in G^-$ (where a represents an anchor digital image, p represents a positive digital image, and n represents a negative digital image). In some embodiments, the style search system 102 combines the reconstruction loss 412 and the triplet loss (e.g., the weakly supervised loss 414) in accordance with:

$$L_{tri}(B) = L_{rec}(B) + \sum_{(a,p,n) \in B} [m + |f(a) - f(p)|_2 - |f(n) - f(p)|_2]_+$$

where $L_{tri}$ represents the triplet loss, $L_{rec}$ represents the reconstruction loss 412, and m represents a margin (e.g., m=0.2).

In at least one embodiment, the style search system 102 implements random negative ("RN") mining to sample $G^-$ from random project groupings. Additionally (or alternatively), the style search system 102 utilizes hard negative ("HN") mining to sample digital images from semantically similar project groupings. For HN, for instance, the style search system 102 identifies samples $n \in G^-$ that satisfy a semantic threshold to encourage disentanglement. For example, the style search system 102 utilizes a semantic threshold given by:

$$|S(n) < S(a) + \Sigma p \in G^+ S(p)| < T$$

where S(.) represents a pre-trained auxiliary embedding derived from a discriminative neural network (e.g., ResNet) train on a database of digital images (e.g., ImageNet). By utilizing a triplet loss function, the style search system 102 encourages the anchor digital image a and the positive digital image p closer together (in embedding space) and the anchor digital image a and the negative digital image n to be farther apart.

In one or more embodiments, the style search system 102 determines a weakly supervised loss 414 utilizing a groupwise or listwise loss function. To elaborate, the style search system 102 determine fine-grain style coherence in groups due to the subjective and under-constrained nature of the task. Using listwise loss, the style search system 102 selects a number of style groups at random and adds samples as anchor digital images (e.g., query digital images) to the batch $B = \{a_1, \ldots, a_{32}\} \subset T$. For each anchor digital image a, the style search system 102 defines $G^+$ to include digital images that are co-present within a project grouping and $G^- = T \backslash G^+$. In some embodiments, the style search system 102 utilizes a listwise loss function as a differentiable approximation of mean average precision ("mAP"). For example, the style search system 102 utilizes a listwise loss function given by:

$$L_{list} = L_{rec}(B) + \sum_{k=1}^{N} \left( \frac{1}{k} \sum_{i=1}^{k} \sum_{j=1}^{N} Y_j^a \mathbb{1}\left[R(f(a), i) = j\right] \right) \times \left( \frac{1}{N^q} \sum_{j=1}^{N} Y_j^q \mathbb{1}\left[R(f(a), k) = j\right] \right)$$

where $R: \mathbb{R}^N \times \mathcal{N} \rightarrow \mathcal{N}$ is the ranking function, $\mathbb{1}$ is the indicator function, and $Y_j^a$ is the status of whether a and j are in the same project grouping.

As mentioned, in some embodiments, the style search system 102 utilizes a style extraction neural network in the form of a weakly supervised discriminative neural network. In particular, the style search system 102 utilizes a weakly supervised discriminative neural network to generate a style embedding for a query digital image to compare with style embeddings of stored digital images. FIG. 5 illustrates an example architecture for a weakly supervised discriminative neural network in accordance with one or more embodiments.

As illustrated in FIG. 5, the style search system 102 inputs a query digital image 502 into the discriminative neural network (e.g., via an input layer). The style search system 102 further utilizes the discriminative neural network to generate the style embedding 504 for the query digital image 502. In particular, the style search system 102 passes features between layers of the discriminative neural network to extract the style embedding 504 from the penultimate fully connected layer of the discriminative neural network.

Indeed, the discriminative neural network includes multiple layers, such as an input layer, convolutional layers, a fully connected layer, and an output layer. For instance, in some embodiments the penultimate fully connected layer includes 2048 dimensions (e.g., to generate the style embedding in 2048 dimensions). Additionally, the discriminative neural network of FIG. 5 includes one or more MLPs. For example, the MLP includes a hidden layer of size 512 and an $L_2$ normalized output vector of 128 dimensions. Thus, rather than determining a weakly supervised loss 506 based on the learned style embedding 504, the style search system 102 determines the weakly supervised loss 506 using the output of the MLP instead.

In some embodiments, the discriminative neural network of FIG. 5 does not include an MLP, and the style search system 102 does not determine a weakly supervised loss 506. Rather, the discriminative neural network utilizes the last layer to extract the style embedding 504. Indeed, in these or other cases, the discriminative neural network generates the style embedding 504 as a vector of 256 dimensions.

To accurately generate the style embedding 504 for the query digital image 502, the style search system 102 learns parameters for the weakly supervised discriminative neural network through training or tuning the network. In particular, the style search system 102 trains the discriminative neural network using a baseline training and a weakly supervised training. In some embodiments, the style search system 102 utilizes multiple loss functions together to train a style extraction neural network such as a discriminative neural network (e.g., a baseline loss function and a weakly supervised loss function).

For baseline training, the style search system 102 utilizes a normalized temperature-scaled cross entropy loss function to determine a normalized temperature-scaled cross entropy loss 508. Additionally, the style search system 102 learns parameters to reduce or minimize the normalized temperature-scaled cross entropy loss 508 over multiple iterations of training the discriminative neural network on sample digital images. To elaborate, the style search system 102 utilizes a normalized temperature-scaled cross entropy loss function by generating a mini-batch B by sampling pairs of digital images $\{a,b\} \in G_i$ from i=[1,N] project groupings (e.g., N=512 project groupings). Thus, the style search system 102 generates a batch of 2N digital images, $B=\{b_1, b_2, \ldots, b_{2N}\}$, where $b_{2i}$ and $b_{2i-1}$ are from the same project grouping. For a given digital image $b_i$, the style search system 102 generates a positive group $G_i^+=\{b_p\}$ and a negative group $G_i^-=B\backslash\{b_i,b_p\}$. In some embodiments, the style search system 102 determines the normalized temperature-scaled cross entropy loss 508 utilizing the normalized temperature-scaled cross entropy loss function given by:

$$L_{con}(B) = \sum_{i=1}^{2N} L(i)$$

where $$L(i) = -\log \sum_{p \in G_i^+} \frac{\exp(f(i) \cdot f(p)/\tau)}{\sum_{n \in G_i^-} \exp(f(i) \cdot f(n)/\tau)}$$

and where $\tau > 0$ is a temperature parameter. As mentioned, the style search system 102 learns parameters for the discriminative neural network of FIG. 5 by identifying parameters that reduce or minimize the normalized temperature-scaled cross entropy loss 508 (and/or the weakly supervised loss 506). In some cases, the above equation for the normalized temperature-scaled cross entropy loss function can be generalized to use $sim(f(i),f(p))$ and $sim(f(i),f(n))$ to replace the $f(i) \cdot f(p)$ and the $f(i) \cdot f(n)$ terms, respectively, where sim(.) represents a similarity function.

For weakly supervised training, the style search system 102 determines a weakly supervised loss 506 utilizing a weakly supervised SoftMax loss function. By using a SoftMax loss function, the style search system 102 utilizes a weak proxy as strong supervision to weakly supervise the training of the discriminative neural network. More specifically, the style search system 102 utilizes a SoftMax loss function to perform n-way classification based on membership in project groupings (as a substitute for labeled data). For the T sample digital images, for example, the style search system 102 performs a 175-thousand-way classification, where each project grouping is a separate classification.

As mentioned above, in some embodiments, the style search system 102 combines complementary aspects of a first style extraction and a second style extraction neural network to generate a style embedding for a query digital image. In particular, the style search system 102 combines a two-branch autoencoder that correlates strongly to color cues and a weakly supervised discriminative neural network that correlates strongly to semantic cues (e.g., depicted types of objects) to generate a combined style embedding that takes advantage of each network's strengths. FIG. 6 illustrates an example depiction of combining a first style extraction neural network and a second style extraction in accordance with one or more embodiments.

As illustrated in FIG. 6, the style search system 102 inputs a query digital image 602 into both a first style extraction neural network 604 and a second style extraction neural network 606. Utilizing the first style extraction neural network 604, the style search system 102 generates a first style embedding 608. Utilizing the second style extraction neural network 606, the style search system 102 generates a second style embedding 610 complementary to the first style embedding 608. In some cases, the first style embedding 608 and the second style embedding 610 are complementary in the sense that the first style embedding 608 correlates closer with some aspects of visual style (e.g., color), while the second style embedding 610 correlates better with other aspects of visual style (e.g., semantics). In some embodiments, the first style extraction neural network 604 refers to a two-branch autoencoder, and the second style extraction neural network refers to a weakly supervised discriminative neural network (or vice-versa).

Indeed, the style search system 102 generates the first style embedding 608 by combining a plurality of style codes extracted via the two-branch autoencoder. In addition, the style search system 102 generates the second style embedding 610 by extracting features from the penultimate fully connected layer of the weakly supervised discriminative neural network. As further illustrated in FIG. 6, the style search system 102 generates a combined style embedding 612. In particular, the style search system 102 combines the first style embedding 608 with the second style embedding 610 to generate a more accurate, fine-grain style embedding that effectively captures color cues and semantic cues for a better overall representation of digital image style.

For example, the style search system 102 generates the combined style embedding 612 by concatenating the first style embedding 608 and the second style embedding 610. In some embodiments, the style search system 102 generates the combined style embedding 612 by determining an average feature value for each dimension (or a subset of dimensions) of the first style embedding 608 and the second style embedding 610. In these or other embodiments, the style search system 102 generates the combined style embedding 612 via max pooling. For example, the style search system 102 compares feature values for each dimension (or a subset of dimensions) across the first style embedding 608 and the second style embedding 610 and selects the higher value among the two to include within the combined style embedding 612. In some embodiments, the style search system 102 generates the combined style embedding 612 by concatenating both noisy and fine-tuned style embeddings (e.g., style embeddings generated from the noisy dataset and the clean dataset, respectively).

Using the combined style embedding 612, the style search system 102 identifies digital images with similar style 614. Particularly, the style search system 102 searches a repository of digital images (e.g., within the database 114) to identify the digital images with similar style 614. For example, the style search system 102 compares style embeddings for the stored digital images within the database 114 with the combined style embedding 612. In some cases, the style search system 102 determines a distance between a style embedding for a stored digital image and the combined style embedding within an embedding space. Additionally, the style search system 102 selects or identifies digital images with similar style 614 as digital images whose style embeddings are within a threshold distance of the combined style embedding 612 within the embedding space. The style search system 102 thus refrains from selecting, or omits, those digital images from the database 114 that are not within the threshold distance.

Figure 7:
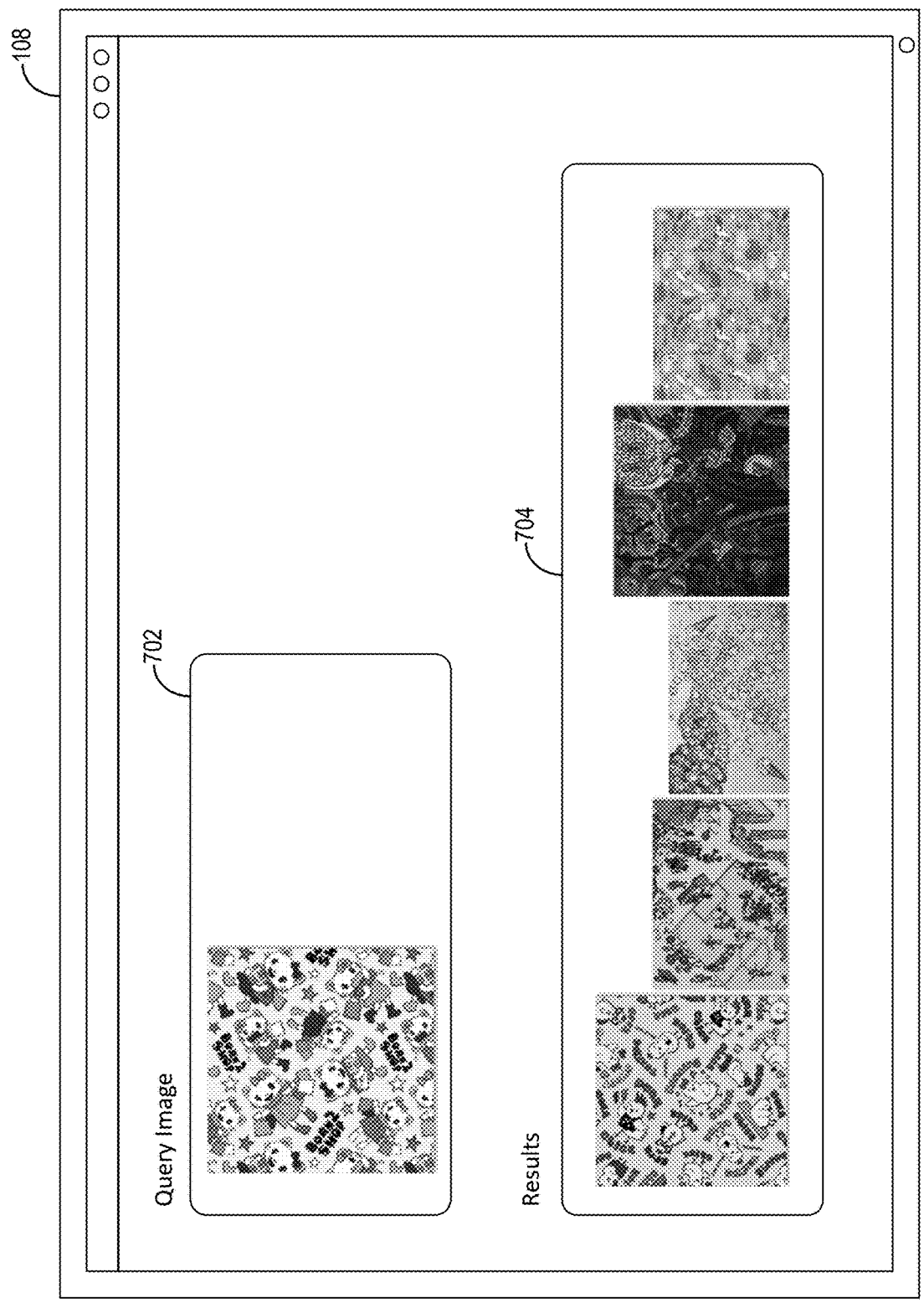
FIG. 7 illustrates an example style search interface in accordance with one or more embodiments.

As mentioned above, in some embodiments, the style search system 102 provides one or more digital images having a style similar to a query digital image for display on a client device. For example, the style search system 102 generates and provides a style search interface for display on the client device 108 and that includes a visual depiction of a query digital image and one or more other digital images with style similar to the query digital image. FIG. 7 illustrates the client device 108 displaying a style search interface in accordance with one or more embodiments.

As illustrated in FIG. 7, the style search interface includes a query digital image 702 and a set of digital images 704 with style similar to the query digital image 702. The style search system 102 generates and provides the style search interface for display on the client device 108. In some embodiments, the style search system 102 provides interactive user interface elements within the style search interface. For example, the style search system 102 provides a selectable style search option to search a repository for digital images with a style similar to the query digital image 702. As another example, the style search system 102 provides a selection option whereby a user is able to select a digital image to use as the query digital image 702.

Based on user interaction selecting the query digital image 702 (e.g., from an online database or a local database on the client device 108), or based on user interaction selecting a style search option for the query digital image 702, the style search system 102 generates a style embedding for the query digital image 702 to compare with style embeddings of stored digital images. As a result of the comparison, the style search system 102 identifies and provides the set of digital images 704 with a style similar to the query digital image 702.

As mentioned above, the style search system 102 provides advantages over conventional systems in accuracy and flexibility. Indeed, researchers have demonstrated the improved accuracy and flexibility of the style search system 102 with regard to identifying digital images with similar styles. Compared to conventional systems, the style search system 102 not only identifies digital images with similar styles more accurately, but the style search system 102 also does so on a finer-grain level than conventional systems (which ordinarily only distinguish between coarse-grain, high level style differences). FIGS. 8A-8C illustrate tables of performance results observed by researches and that demonstrate the improvements of the style search system 102 in accordance with one or more embodiments.

To obtain the observed performance data of FIGS. 8A-8C, researchers utilized the 1.2 million digital images from the Behance.net project groupings described above (in relation to FIG. 3) within the second partition. For example, researchers split the 1.2 million clean digital images into a training set (including 80 thousand project groupings) and a test set (including 20 thousand project groupings).

Additionally, researchers obtained performance results from conventional digital image search systems to compare with the style search system 102. As illustrated in FIG. 8A, for example, the table includes performance results for several conventional systems, including Karayev, Neural Style Transfer ("NST"), Neural Style Transfer for Cosine of Gram Matrices ("NST-CGM"), Deep Metric Learning on the Behance Artistic Media dataset ("DML-BAM"), and Deep Metric Learning on the Extended Behance Artistic Media dataset ("DML-BAMX"). As shown in the table, these conventional systems obtain relatively low performance in fine-grain style determination using the Behance Artistic Media-Fine Grain ("BAM-FG") dataset. The performance is measured by an information retrieval ("IR") metric that expresses a percentage of queries for which a relevant result (e.g., a same project grouping) occurs within a top k ranked results, for ranks k={1,3,5,10}.

Compared to the conventional systems in the table of FIG. 8A, the style search system 102 achieves much better performance on fine-grain style determination over the BAM-FG dataset. Indeed, FIG. 8B illustrates performance of the style search system 102 using different types of style extraction system and different loss functions (or combinations of loss functions) described herein. For instance, the table in FIG. 8B shows IR performance of the style search system 102 utilizing the ALADIN style extraction neural network (e.g., the novel two-branch autoencoder architecture) with $L_1$ reconstruction loss and listwise loss. Compared to the data in the table of FIG. 8A, the style search system 102 in this variation achieves better performance than all of the tested conventional systems for IR-1, IR-5, and IR-10 metrics (by several times in some cases). Likewise, other variations of the style search system 102 with different style extraction neural networks also achieve better performance that the conventional systems of FIG. 8A. For example, the style search system 102 utilizing the MUNIT style extraction neural network with $L_1$ reconstruction loss and triplet loss achieves better performance, as does the ALADIN style extraction neural network with $L_1$ reconstruction loss and triplet loss, and the MUNIT style extraction neural network with $L_1$ reconstruction loss and listwise loss.

Further improving over the conventional systems of FIG. 8A, some variations of the style search system 102 use a combined (e.g., "fused") style extraction neural network, including a two-branch autoencoder and a weakly supervised discriminative neural network). As illustrated in the table of FIG. 8C, the style search system 102 using the fused style extraction neural network achieves the best performance over fine-grain data from among all tested systems. As shown, the style search system 102 having this configuration achieves high performance for IR-1, IR-3, IR-5, and IR-10 metrics over two different BAM datasets.

Figure 9:
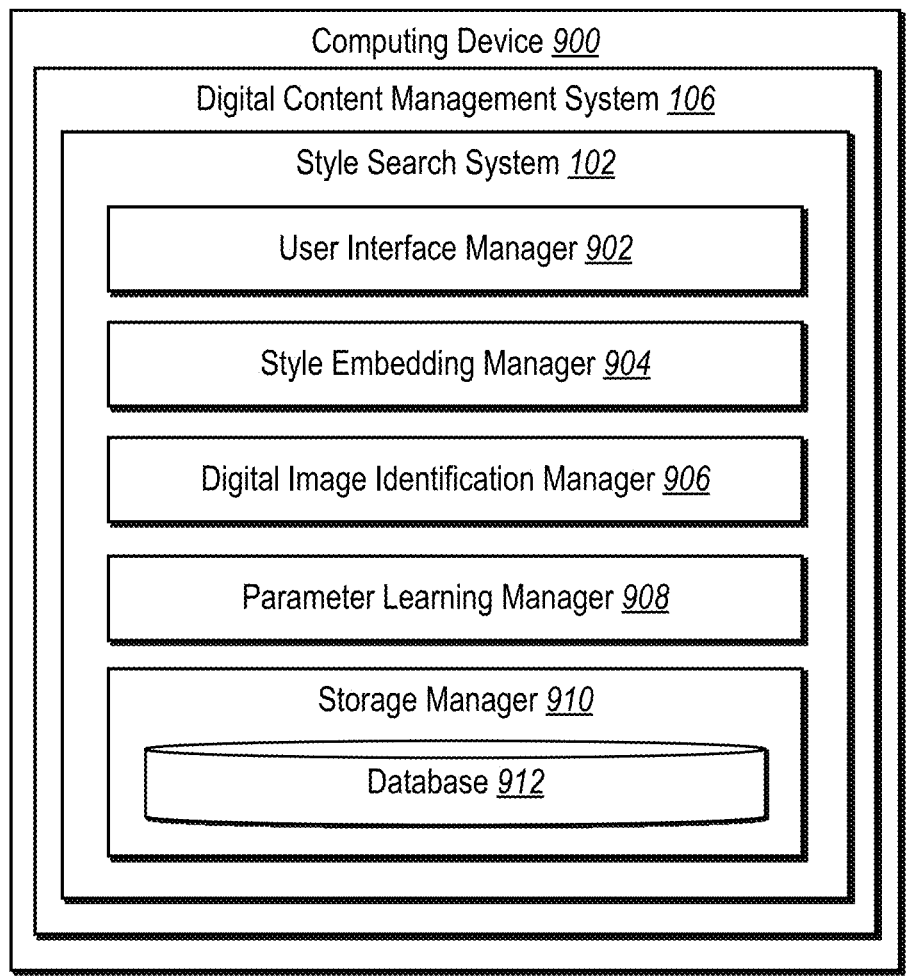
FIG. 9 illustrates a schematic diagram of a style search system in accordance with one or more embodiments.

Looking now to FIG. 9, additional detail will be provided regarding components and capabilities of the style search system 102. Specifically, FIG. 9 illustrates an example schematic diagram of the style search system 102 on an example computing device 900 (e.g., one or more of the client device 108 and/or the server(s) 104). As shown in FIG. 9, the style search system 102 includes a user interface manager 902, a style embedding manager 904, a digital image identification manager 906, a parameter learning manager 908, and a storage manager 910.

As just mentioned, the style search system 102 includes a user interface manager 902. In particular, the user interface manager 902 manages, maintains, provides, displays, presents, or renders user interfaces such as a style search interface. The user interface manager 902 further includes interactive elements within a style search interface such as a selectable search option and an interactive element to identify a query digital image. Further, based on receiving user interaction to request a search based on a query digital image, the user interface manager 902 provides a visual depiction of the query digital image as well as other digital images that have a style similar to the query digital image.

Additionally, the style search system 102 includes a style embedding manager 904. In particular, the style embedding manager 904 manages, determines, identifies, generate, or extracts one or more style embeddings for digital images. For example, the style embedding manager 904 generates a style embedding for a query digital image and further generates style embeddings for stored digital images within a repository of digital images. Specifically, the style embedding manager 904 utilizes a style extraction neural network such as a two-branch autoencoder, a weakly supervised discriminative neural network, or a combination of the two to generate a style embedding. In some embodiments, the style embedding manager 904 generates a combined style embedding by concatenating a first style embedding from a first style extraction neural network with a second style embedding from a second style extraction neural network.

As shown, the style search system 102 further includes a digital image identification manager 906. In particular, the digital image identification manager 906 manages, determines, generates, selects, or identifies digital images from a repository of digital image that have style similar to a query digital image. For example, the digital image identification manager 906 compares a style embedding of a query digital image and style embeddings of digital images stored within a repository of digital images (e.g., within the database 912). In some embodiments, the digital image identification manager 906 determines distances between a style embedding of a query digital image and style embeddings of other digital images within an embedding space. The digital image identification manager 906 selects digital images whose style embeddings are within a threshold distance of the style embedding of the query digital image as digital images with style similar to the query digital image.

As further shown in FIG. 9, the style search system 102 includes a parameter learning manager 908. In particular, the parameter learning manager 908 learns parameters for one or more style extraction neural networks by training or tuning the networks over multiple iterations or epochs. For example, the parameter learning manager 908 trains a style extraction neural network over a particular number of epochs using a particular processor (e.g., NVIDIA RTX 1080 GPU). Indeed, over the training epochs, the parameter learning manager 908 analyzes sample digital images to learn various internal weights and network parameters (e.g., instance normalization parameters) associated with the particular style extraction neural networks described herein. The parameter learning manager 908 learns the parameters that minimize or reduce particular loss functions and that thereby produce desirable performance metrics for the style extraction neural networks.

The style search system 102 further includes a storage manager 910. The storage manager 910 operates in conjunction with or include one or more memory devices such as the database 912 (e.g., the database 114) that store various data such as algorithms for a style extraction neural network and a repository of digital images. The storage manager 910 (e.g. via a non-transitory computer memory/one or more memory devices) stores and maintain data associated with managing digital images and style extraction neural networks (e.g., within the database 912).

In one or more embodiments, each of the components of the style search system 102 are in communication with one another using any suitable communication technologies. Additionally, the components of the style search system 102 is in communication with one or more other devices including one or more client devices described above. It will be recognized that although the components of the style search system 102 are shown to be separate in FIG. 9, any of the subcomponents may be combined into fewer components, such as into a single component, or divided into more components as may serve a particular implementation. Furthermore, although the components of FIG. 9 are described in connection with the style search system 102, at least some of the components for performing operations in conjunction with the style search system 102 described herein may be implemented on other devices within the environment.

The components of the style search system 102 can include software, hardware, or both. For example, the components of the style search system 102 can include one or more instructions stored on a computer-readable storage medium and executable by processors of one or more computing devices (e.g., the computing device 900). When executed by the one or more processors, the computer-executable instructions of the style search system 102 can cause the computing device 900 to perform the methods described herein. Alternatively, the components of the style search system 102 can comprise hardware, such as a special purpose processing device to perform a certain function or group of functions. Additionally, or alternatively, the components of the style search system 102 can include a combination of computer-executable instructions and hardware.

Furthermore, the components of the style search system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the style search system 102 may be implemented as part of a stand-alone application on a personal computing device or a mobile device. Alternatively, or additionally, the components of the style search system 102 may be implemented in any application that allows creation and delivery of marketing content to users, including, but not limited to, applications in ADOBE EXPERIENCE MANAGER and ADOBE CREATIVE CLOUD, such as ADOBE ILLUSTRATOR, ADOBE PHOTOSHOP, and ADOBE INDESIGN. "ADOBE," "ADOBE EXPERIENCE MANAGER," "ADOBE CREATIVE CLOUD," "ADOBE ILLUSTRATOR," "ADOBE PHOTOSHOP," and "ADOBE INDESIGN" are trademarks of Adobe Inc. in the United States and/or other countries FIGS. 1-9, the corresponding text, and the examples provide a number of different systems, methods, and non-transitory computer readable media for identifying digital images with similar style to a query digital image using fine-grain style determination via weakly supervised style extraction neural networks. In addition to the foregoing, embodiments can also be described in terms of flowcharts comprising acts for accomplishing a particular result. For example, FIG. 10 illustrates a flowchart of an example sequence or series of acts in accordance with one or more embodiments.

Figure 10:
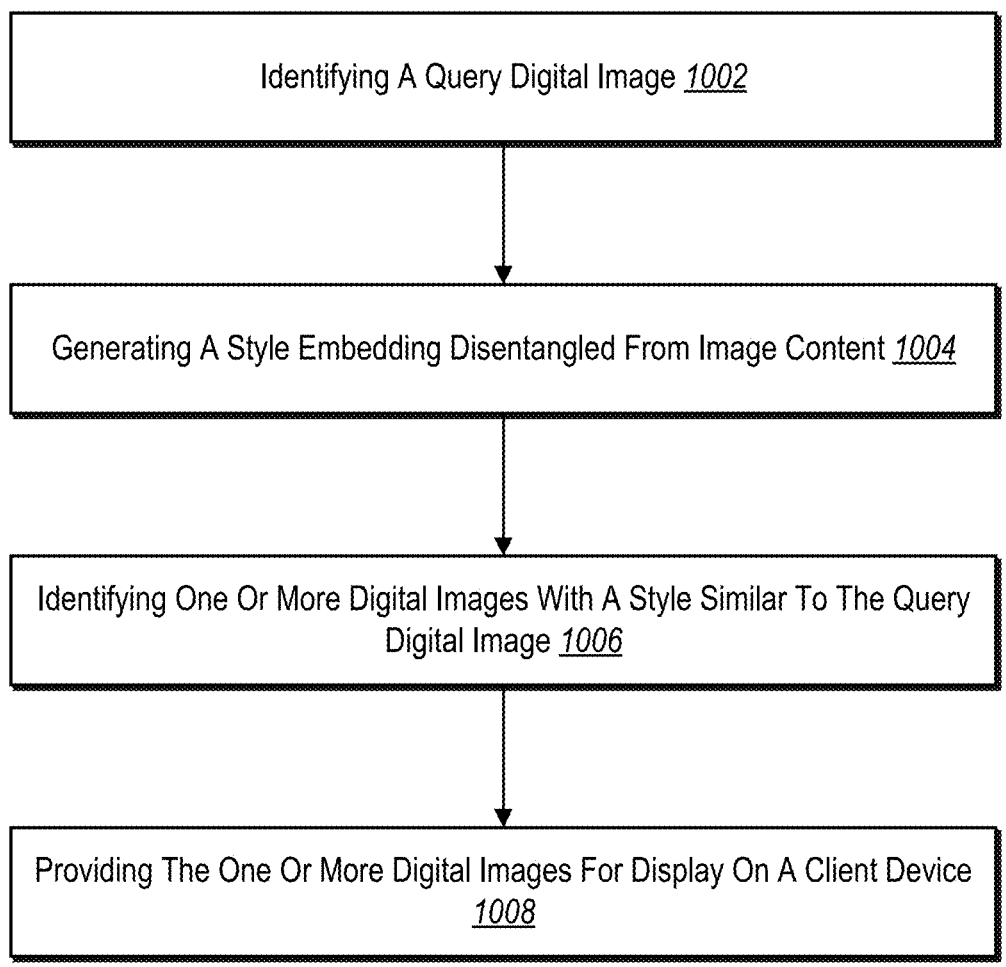
FIG. 10 illustrates a flowchart of a series of acts for identifying digital images with similar style to a query digital image using fine-grain style determination via weakly supervised style extraction neural networks in accordance with one or more embodiments.

While FIG. 10 illustrates acts according to one embodiment, alternative embodiments may omit, add to, reorder, and/or modify any of the acts shown in FIG. 10. The acts of FIG. 1—can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of identifying digital images with similar style to a query digital image using fine-grain style determination via weakly supervised style extraction neural networks. In particular, the series of acts 1000 includes an act 1002 of identifying a query digital image. For example, the act 1002 involves identifying a query digital image as a basis for searching for other digital images with similar style to the query digital image. The act 1002 includes receiving an indication of user interaction selecting the query digital image via the client device.

The series of acts 1000 also includes an act 1004 of generating a style embedding disentangled from image content. In particular, the act 1004 involves generating a style embedding disentangled from image content from the query digital image utilizing a style extraction neural network. In some embodiments, the act 1004 involves extracting a content code indicating a geometric layout of the query digital image, extracting a plurality of style codes from different layers of the style extraction neural network, and combining the plurality of style codes into the style embedding. In the same or other embodiments, the act 1004 involves extracting the style embedding from a penultimate layer of a discriminative neural network trained using weakly supervised contrastive learning. In one or more embodiments, the act 1004 involves extracting a first style code utilizing a two-branch autoencoder neural network, extracting a second style code complementary to the first style code utilizing a discriminative neural network, and combining the first style code and the second style code into the style embedding.

In some embodiments, the act 1004 involves utilizing a second style extraction neural network to extract, from a penultimate layer of the second style extraction neural network, an additional style code complementary to the plurality of style codes. In these or other embodiments, the act 1004 involves concatenating the plurality of style codes and the additional style code. In some cases, the act 1004 further involves extract the plurality of style codes to correlate for color cues and to extract the additional style code to correlate for semantic cues. The act 1004 involves combining the plurality of style codes into the style embedding utilizing a multilayer perceptron.

As illustrated in FIG. 10, the series of acts 1000 further includes an act 1006 of identifying one or more digital images with a style similar to the query digital image. In particular, the act 1006 involves identifying or determining one or more digital images from a repository of digital images and having a style similar to the query digital image by comparing the style embedding and style embeddings associated with digital images within the repository of digital images. For example, the act 1006 involves determining distances in an embedding space between the style embedding of the query digital image and the style embeddings associated with the digital image within the repository of digital images. In some embodiments, the act 1006 involves selecting one or more digital images from the repository of digital images for display by identifying digital images corresponding to style embeddings within a threshold distance of the style embedding of the query digital image.

In some embodiments, the act 1006 involves determining a first distance in an embedding space between the style embedding of the query digital image and a first style embedding associated with a first digital image within the repository of digital images. The act 1006 further involves determining a second distance in the embedding space between the style embedding of the query digital image and a second style embedding associated with a second digital image within the repository of digital images. In these or other embodiments, the act 1006 involves selecting the first digital image for display by determining that the first distance is within a threshold distance of the style embedding of the query digital image and refraining from selecting the second digital image for display by determining that the second distance is not within the threshold distance of the style embedding of the query digital image.

As further shown, the series of acts 1000 includes an act 1008 of providing the one or more digital images for display on a client device. In particular, the act 1008 involves providing the one or more digital images having a style similar to the query digital image for display on a client device. For example, the act 1008 involves providing a style search interface including the query digital image and a plurality of additional digital images having a similar visual aesthetic to query digital image.

In some embodiments, the series of acts 1000 include an act of learning parameters associated with the style extraction neural network using a weakly supervised technique without a defined style ontology. In these or other embodiments, learning parameters includes utilizing a listwise loss function to determine fine-grain style coherence. The series of acts 1000 further includes an act of learning parameters associated with the style extraction neural network using visual coherence among digital images within common crowd-sourced project groups and without using labeled sample digital images. Indeed, the series of acts 1000 includes an act of learning parameters associated with a style extraction neural network without labelled digital images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
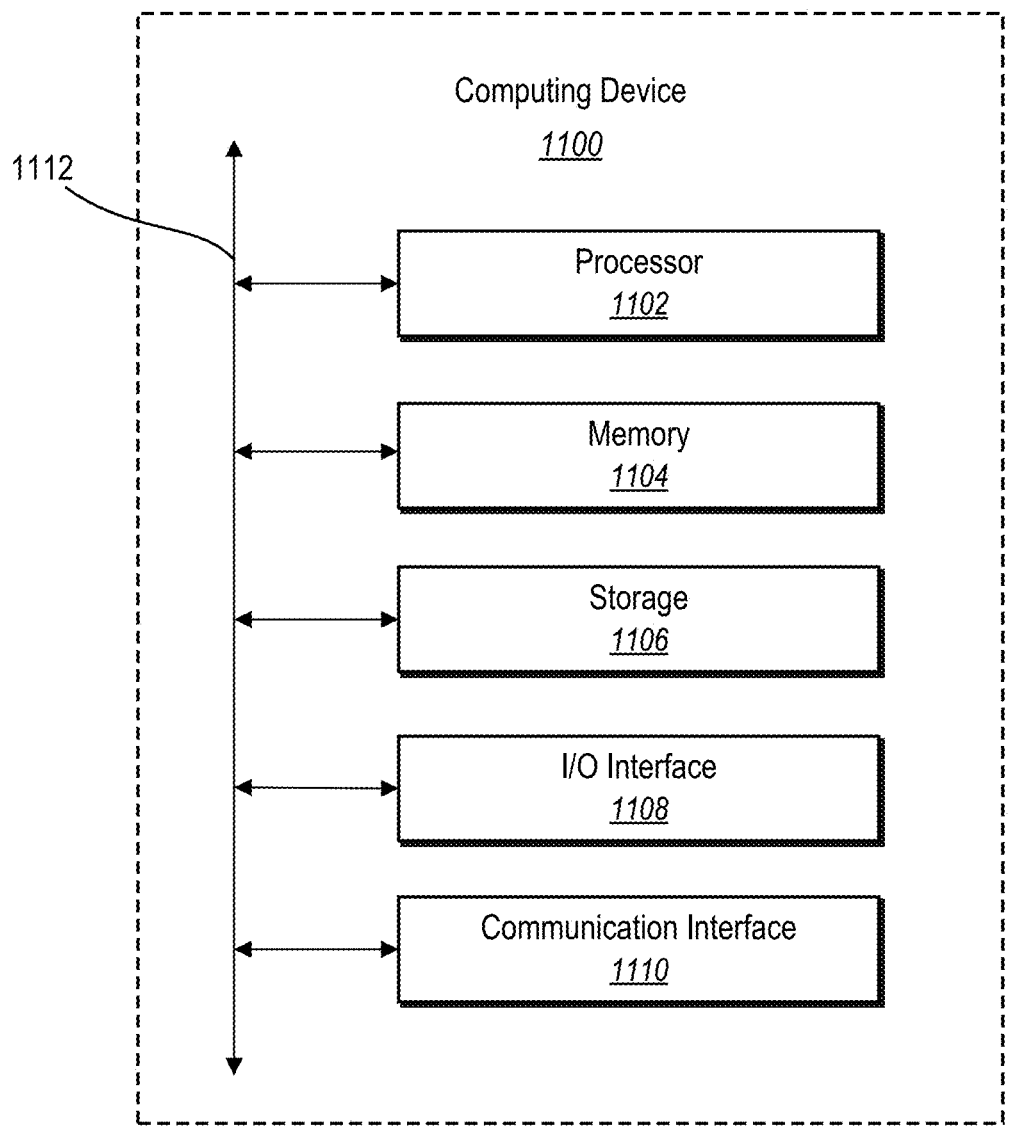
FIG. 11 illustrates a block diagram of an example computing device in accordance with one or more embodiments.

FIG. 11 illustrates, in block diagram form, an example computing device 1100 (e.g., the computing device 900, the client device 108, and/or the server(s) 104) that may be configured to perform one or more of the processes described above. One will appreciate that the style search system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to perform operations comprising:
    identifying a query digital image as a basis for searching for other digital images with similar style to the query digital image;
    generating a style embedding disentangled from image content from the query digital image utilizing a style extraction neural network trained with weak supervision;
    identifying one or more digital images from a repository of digital images and having a style similar to the query digital image by comparing the style embedding and style embeddings associated with digital images within the repository of digital images to determine the one or more digital images from corresponding style embeddings within a threshold distance of the style embedding of the query digital image; and
    providing the one or more digital images having a style similar to the query digital image for display on a client device.

2. The non-transitory computer readable medium of claim 1, wherein generating the style embedding disentangled from image content comprises utilizing the style extraction neural network to:
    extract a content code indicating a geometric layout of the query digital image;
    extract a plurality of style codes from different layers of the style extraction neural network; and
    combine the plurality of style codes into the style embedding.

3. The non-transitory computer readable medium of claim 1, wherein generating the style embedding disentangled from image content comprises extracting the style embedding from a penultimate layer of a discriminative neural network trained using weakly supervised contrastive learning.

4. The non-transitory computer readable medium of claim 1, wherein generating the style embedding disentangled from image content comprises:
    extracting a first style code utilizing a two-branch auto-encoder neural network;
    extracting a second style code complementary to the first style code utilizing a discriminative neural network; and combining the first style code and the second style code into the style embedding.

5. The non-transitory computer readable medium of claim 1, wherein identifying the one or more digital images from the repository of digital image and having a style similar to the query digital image comprises determining distances in an embedding space between the style embedding of the query digital image and the style embeddings associated with the digital image within the repository of digital images.

6. The non-transitory computer readable medium of claim 1, wherein the style extraction neural network is trained with weak supervision such that a common image grouping indicates a measure of style commonality among digital images in the common image grouping.

7. The non-transitory computer readable medium of claim 1, further comprising instructions that, when executed by the at least one processor, cause the at least one processor to perform operations comprising learning parameters associated with the style extraction neural network using a weakly supervised technique without a defined style ontology.

8. The non-transitory computer readable medium of claim 7, wherein learning the parameters associated with the style extraction neural network comprises utilizing a listwise loss function to determine fine-grain style coherence.

9. A computer-implemented method comprising:
identifying a query digital image as a basis for searching for other digital images with similar style to the query digital image;
generating a style embedding disentangled from image content from the query digital image utilizing a style extraction neural network trained with weak supervision;
identifying one or more digital images from a repository of digital images and having a style similar to the query digital image by comparing the style embedding and style embeddings associated with digital images within the repository of digital images to determine the one or more digital images from corresponding style embeddings within a threshold distance of the style embedding of the query digital image; and
providing the one or more digital images having a style similar to the query digital image for display on a client device.

10. The computer-implemented method of claim 9, wherein generating the style embedding disentangled from image content comprises utilizing the style extraction neural network to:
extract a content code indicating a geometric layout of the query digital image;
extract a plurality of style codes from different layers of the style extraction neural network; and
combine the plurality of style codes into the style embedding.

11. The computer-implemented method of claim 9, wherein generating the style embedding disentangled from image content comprises extracting the style embedding from a penultimate layer of a discriminative neural network trained using weakly supervised contrastive learning.

12. The computer-implemented method of claim 9, wherein generating the style embedding disentangled from image content comprises:
extracting a first style code utilizing a two-branch auto-encoder neural network;
extracting a second style code complementary to the first style code utilizing a discriminative neural network; and
combining the first style code and the second style code into the style embedding.

13. The computer-implemented method of claim 9, wherein identifying the one or more digital images from the repository of digital image and having a style similar to the query digital image comprises determining distances in an embedding space between the style embedding of the query digital image and the style embeddings associated with the digital image within the repository of digital images.

14. The computer-implemented method of claim 9, wherein the style extraction neural network is trained with weak supervision such that a common image grouping indicates a measure of style commonality among digital images in the common image grouping.

15. The computer-implemented method of claim 9, further comprising learning parameters associated with the style extraction neural network using a weakly supervised technique without a defined style ontology.

16. The computer-implemented method of claim 15, wherein learning the parameters associated with the style extraction neural network comprises utilizing a listwise loss function to determine fine-grain style coherence.

17. A system comprising:
one or more memory devices; and
one or more processors coupled to the one or more memory devices that cause the system to perform operations comprising:
identifying a query digital image as a basis for searching for other digital images with similar style to the query digital image;
generating a style embedding disentangled from image content from the query digital image utilizing a style extraction neural network trained with weak supervision;
identifying one or more digital images from a repository of digital images and having a style similar to the query digital image by comparing the style embedding and style embeddings associated with digital images within the repository of digital images to determine the one or more digital images from corresponding style embeddings within a threshold distance of the style embedding of the query digital image; and
providing the one or more digital images having a style similar to the query digital image for display on a client device.

18. The system of claim 17, wherein generating the style embedding disentangled from image content comprises utilizing the style extraction neural network to:
extract a content code indicating a geometric layout of the query digital image;
extract a plurality of style codes from different layers of the style extraction neural network; and
combine the plurality of style codes into the style embedding.

19. The system of claim 17, wherein generating the style embedding disentangled from image content comprises extracting the style embedding from a penultimate layer of a discriminative neural network trained using weakly supervised contrastive learning.

20. The system of claim 17, wherein generating the style embedding disentangled from image content comprises:
extracting a first style code utilizing a two-branch auto-encoder neural network;
extracting a second style code complementary to the first style code utilizing a discriminative neural network; and
combining the first style code and the second style code into the style embedding.

* * * * *